United States Patent
Bodo

(10) Patent No.: US 9,314,011 B2
(45) Date of Patent: *Apr. 19, 2016

(54) PYROTECHNIC DEVICE WITH PROTECTIVE COVER

(75) Inventor: Lionel Bodo, Ayze (FR)

(73) Assignee: CREA, Bonneville (FR)

( * ) Notice: Subject to any disclaimer, the term of this patent is extended or adjusted under 35 U.S.C. 154(b) by 651 days.

This patent is subject to a terminal disclaimer.

(21) Appl. No.: 13/314,310

(22) Filed: Dec. 8, 2011

(65) Prior Publication Data

US 2012/0144727 A1  Jun. 14, 2012

(30) Foreign Application Priority Data

Dec. 9, 2010  (FR) ...................................... 10 60328

(51) Int. Cl.
*A01M 27/00*  (2006.01)
*A01M 23/38*  (2006.01)

(52) U.S. Cl.
CPC .............. *A01M 27/00* (2013.01); *A01M 23/38* (2013.01)

(58) Field of Classification Search
CPC .............................. A01M 27/00; A01M 23/38
USPC ............................................................. 43/84
See application file for complete search history.

(56) References Cited

U.S. PATENT DOCUMENTS

| | | | | |
|---|---|---|---|---|
| 1,848,614 A | * | 3/1932 | Folmer et al. | 43/112 |
| 1,899,199 A | * | 2/1933 | Kaiser | 43/98 |
| 1,936,468 A | * | 11/1933 | Folmer et al. | 43/112 |
| 3,346,988 A | * | 10/1967 | Pickering | 43/112 |
| 3,491,478 A | * | 1/1970 | Gilbert | 43/112 |
| 3,894,351 A | * | 7/1975 | Iannini | 43/112 |
| 3,998,000 A | * | 12/1976 | Gilbert | 43/112 |
| 4,074,456 A | * | 2/1978 | Tidwell | 43/98 |
| 4,109,406 A | * | 8/1978 | Denninger | 43/84 |
| 4,182,069 A | * | 1/1980 | De Yoreo | 43/112 |
| 4,213,265 A | * | 7/1980 | Denninger et al. | 43/84 |
| 4,709,502 A | * | 12/1987 | Bierman | 43/112 |
| 4,780,985 A | * | 11/1988 | Coots | 43/98 |
| 6,009,662 A | * | 1/2000 | Chang | 43/112 |
| 9,144,232 B2 | * | 9/2015 | Bodo | A01M 27/00 |

FOREIGN PATENT DOCUMENTS

| | | | | |
|---|---|---|---|---|
| EP | 1109446 B1 | 6/2001 | | |
| FR | 2719192 A1 | * 11/1995 | ............ | A01M 27/00 |
| FR | 2750294 A1 | * 1/1998 | ............ | A01M 23/38 |
| FR | 2832029 A1 | * 5/2003 | ............ | A01M 27/00 |
| FR | 2897510 A1 | 8/2007 | | |

(Continued)

*Primary Examiner* — Darren W Ark
(74) *Attorney, Agent, or Firm* — William H. Eilberg

(57) ABSTRACT

The pyrotechnic device (1) is intended for the destruction of animals that dig tunnels, such as moles, by firing a pyrotechnic charge (2), comprising means (3) for detecting the animal and a housing (4). The housing (4) contains: an electrical firing circuit comprising a firing contactor driven by the detection means (3); and means for breaking the electrical firing circuit, making it possible to selectively break or re-establish the continuity of a section of the electrical firing circuit. The pyrotechnic device (1) includes a removable cover (9), which can be fitted over the housing (4) and over the detection means (3) in a covering position to establish the continuity of the firing circuit, and which can be removed to a removed position to break the continuity of the electrical firing circuit.

9 Claims, 11 Drawing Sheets

(56) References Cited

FOREIGN PATENT DOCUMENTS

| FR | 2900542 | A1 | * | 11/2007 | ............ A01M 27/00 |
| GB | 2343356 | A | * | 5/2000 | ............ A01M 23/38 |
| GB | 2354693 | A | | 4/2001 | |
| WO | 00/11945 | A1 | | 3/2000 | |

* cited by examiner

PYROTECHNIC DEVICE WITH PROTECTIVE COVER

TECHNICAL FIELD OF THE INVENTION

The present invention relates to a device intended for the destruction of animals that dig tunnels such as moles, and relates more particularly to a pyrotechnic device intended to destroy animals by firing a pyrotechnic charge.

Such a device is, for example, known from the document FR 2 832 029. Such a device generally comprises means for detecting the animal and a housing containing:

- an electrical firing circuit comprising a firing contactor driven by the detection means,
- means for breaking the electrical firing circuit making it possible to selectively break or re-establish the continuity of a section of electrical firing circuit.

The detection means are generally installed in the open chimney of a tunnel, whereas the pyrotechnic charge is installed in the tunnel. When the mole comes to re-seal the chimney which has remained open, the latter pushes back the earth and then displaces the detection means, and this causes the firing contactor to close and the pyrotechnic charge to be fired. The shockwave caused by the blast then kills the animal.

This type of trap is effective and makes it possible, by burying the pyrotechnic charge, to avoid injuring a user or causing surface damage.

However, there is a risk of accidentally triggering the device when it is inserted and of activating the pyrotechnic charge. To limit this risk, safety systems have been proposed.

The document EP 1 109 446 describes for this purpose a safety device, consisting of a movable part, one of the positions of which mechanically opposes the establishing of the firing contact, and which is capable of preventing any unwanted triggering of the pyrotechnic charge during the pyrotechnic-charge activating operations or when removing the pyrotechnic device.

The document FR 2 897 510 describes an electronic safety system for allowing the firing of the pyrotechnic charge only after a determined time counted from the activation of the trap, activation which corresponds to a specific manipulation of the device by the operator when putting the pyrotechnic device in place.

The safety devices of the abovementioned documents do not however give satisfaction. It is in fact possible for a user of the device of the document EP 1 109 446 to omit or forget the movable part intended to mechanically oppose the establishing of the firing contact. Also, it is difficult, for a user of the device of document FR 2 897 510, to estimate the time he or she is granted to reach shelter after activation.

In addition, none of these devices effectively protects a user against any unwanted triggering of the pyrotechnic charge once the pyrotechnic device is installed. This is because it is possible for a child who is not being watched to manipulate the pyrotechnic device after installation to the point of stressing the detection means which then provoke the accidental firing of the pyrotechnic charge.

The document FR 2 719 192 describes a mole-fighting pyrotechnic device, comprising an enclosure sealed by a cover articulated by hinges on the enclosure. For the firing circuit to be activated, the cover must be locked in order to close an electronic contactor actuated by a permanent magnet fixed to the bolt of the lock. If a user grasps the pyrotechnic device in the active state by its cover, the firing circuit is not deactivated since the cover is locked. Firing must then be avoided by providing a mercury contactor circuit-breaker capable of detecting a tilting of the device, and a permanent-magnet electronic circuit breaker capable of detecting a lifting of the device, which is complex and very costly.

Another drawback with the existing devices is that it is difficult to visually take immediate stock of the state of the pyrotechnic device: it is not known whether the latter is activated, so that its pyrotechnic charge is ready to explode, or whether said pyrotechnic device is deactivated, any explosion of the pyrotechnic charge being prevented and the device then being ineffective.

SUMMARY OF THE INVENTION

A first problem proposed by the invention is to simply and effectively limit the risk of unwanted triggering of the pyrotechnic charge of the pyrotechnic device, and to do so both when putting the pyrotechnic device in place and after it has been put in place, as well as when it is removed.

According to another aspect, the invention aims to allow for a fast visual diagnostic of the pyrotechnic device in order to unambiguously determine its state of activation or deactivation.

To achieve these aims and others, the invention proposes a pyrotechnic device intended for the destruction of animals that dig tunnels such as moles by firing a pyrotechnic charge, comprising means for detecting the animal and a housing, in which:

- the housing contains an electrical firing circuit comprising a firing contactor driven by the detection means,
- the housing contains means for breaking the electrical firing circuit, making it possible to selectively break or re-establish the continuity of a section of electrical firing circuit,
- a cover can be arranged over the housing and over the detection means in a covering position in which the continuity of the section of electrical firing circuit is established, and in which the cover is removable, so as to be able to be separated from the housing in a removed position in which the continuity of the section of electrical firing circuit is broken.

The pyrotechnic device according to the invention is put in place with its cover absent. The continuity of the section of the electrical firing circuit is then broken and there is then no risk of accidental explosion of the pyrotechnic charge. The safety of the persons is therefore assured when putting the pyrotechnic device in place.

In order to establish the continuity of the section of electrical firing circuit, the cover must necessarily be fitted in the covering position so that the state of the pyrotechnic device can be unambiguously perceived visually. If the cover is in the covering position, then the pyrotechnic device is activated. If the cover is in the removed position, then the pyrotechnic device is deactivated.

When the pyrotechnic device is activated, the removable cover is in the covering position and simultaneously covers the housing and the detection means. The removable cover thus limits the access to the detection means and to the housing, which provides protection for the persons once the pyrotechnic device is put in place.

When a user grasps a mole-fighting pyrotechnic device according to the invention, he or she naturally grasps the cover thereof in order to lift the whole of the pyrotechnic device. According to the present invention, this grasping by the cover results in the cover being separated from the housing, to the great surprise of the user who was thinking he would be carrying away all the pyrotechnic device. As soon as the separation of the cover has occurred, the firing circuit is disabled, so that the user is thus protected without being aware of it in a simple, effective and inexpensive way.

For example, a child wanting to manipulate the pyrotechnic device once the latter has been put in place will have to remove the removable cover in order to be able to access the detection means and/or the housing. The child will be able to freely manipulate the housing and/or the detection means only once the removable cover has been removed, which will have previously deactivated the pyrotechnic device.

In a first embodiment of the invention, provision can be made for:
- the breaking means to comprise a switch, connected in series in the electrical firing circuit, and permanently returned to the open position by elastic return means,
- the cover to include bearing means which, when the cover is displaced to the covering position, push back the switch to the closed position against the elastic return means.

In a second embodiment of the present invention, provision can be made for:
- the electrical firing circuit to include a movable circuit section attached to the cover and a fixed circuit part attached to the housing, said fixed circuit part including a break,
- when the cover is in the covering position, the movable circuit section is in contact with the fixed circuit part to establish the continuity of the electrical firing circuit in the area of the break.

Preferably, provision can be made for:
- the housing to include a bottom laying face suitable for resting on the ground,
- the housing and the cover to be conformed and dimensioned so that, when the housing rests on the ground and the cover is in the covering position, the cover prevents a user from being able to manually grasp the housing and the detection means.

Thus there are few risks that, once placed on the ground, the pyrotechnic device will be accidentally triggered and injure a person.

Preferably, provision can be made for the cover to include a top wall having dimensions such that said top wall juts out all around the housing and the detection means by a peripheral overhang.

The peripheral overhang makes it possible to effectively prevent a user from accessing the housing and/or the detection means, and thus avoids an accidental firing of the pyrotechnic charge.

Advantageously, provision can be made for:
- the housing to have a bottom laying face suitable for resting on the ground,
- the cover to include a lateral peripheral wall extending away from the top wall to a bottom peripheral edge,
- the lateral peripheral wall to have a height such that, when the housing rests on the ground and the cover is fitted on the housing, the bottom peripheral edge is situated in the vicinity of the level of the bottom laying face.

The user will thus have difficulty passing his hands under the removable cover to access the housing or the detection means. It will thus be very difficult for him or her to manage to trigger a firing without having first removed the removable cover and thus deactivated the pyrotechnic device.

Advantageously, the detection means may include a feeler intended to be wholly or partly inserted into the tunnel of the animal.

A feeler is a simple, reliable and effective means for detecting an animal such as a mole.

Preferably, said feeler may comprise a plurality of separable rod sections.

The length of the feeler can thus easily be modified and adapted to the depth of the tunnel dug by the animals, and remains compatible with the presence of the removable cover when the latter is in the covering position.

As an alternative, it is possible to provide for said feeler to comprise a telescopic rod.

Advantageously, provision can be made for:
- the housing to have a bottom laying face suitable for resting on the ground,
- the housing to include means for anchoring in the ground extending from the bottom laying face.

The anchoring means make it possible to avoid any movement of the housing once the pyrotechnic device is installed on the ground. The risk of unwanted movements of the housing and/or of the detection means, movements likely to cause an accidental firing of the pyrotechnic charge, is thus limited.

BRIEF DESCRIPTION OF THE DRAWINGS

Other objects, features and advantages of the present invention will emerge from the following description of particular embodiments, given with reference to the appended figures, in which.

DESCRIPTION OF THE PREFERRED EMBODIMENTS

FIGS. 1 to 12 illustrate two embodiments of a pyrotechnic device according to the invention.

Figure 1:
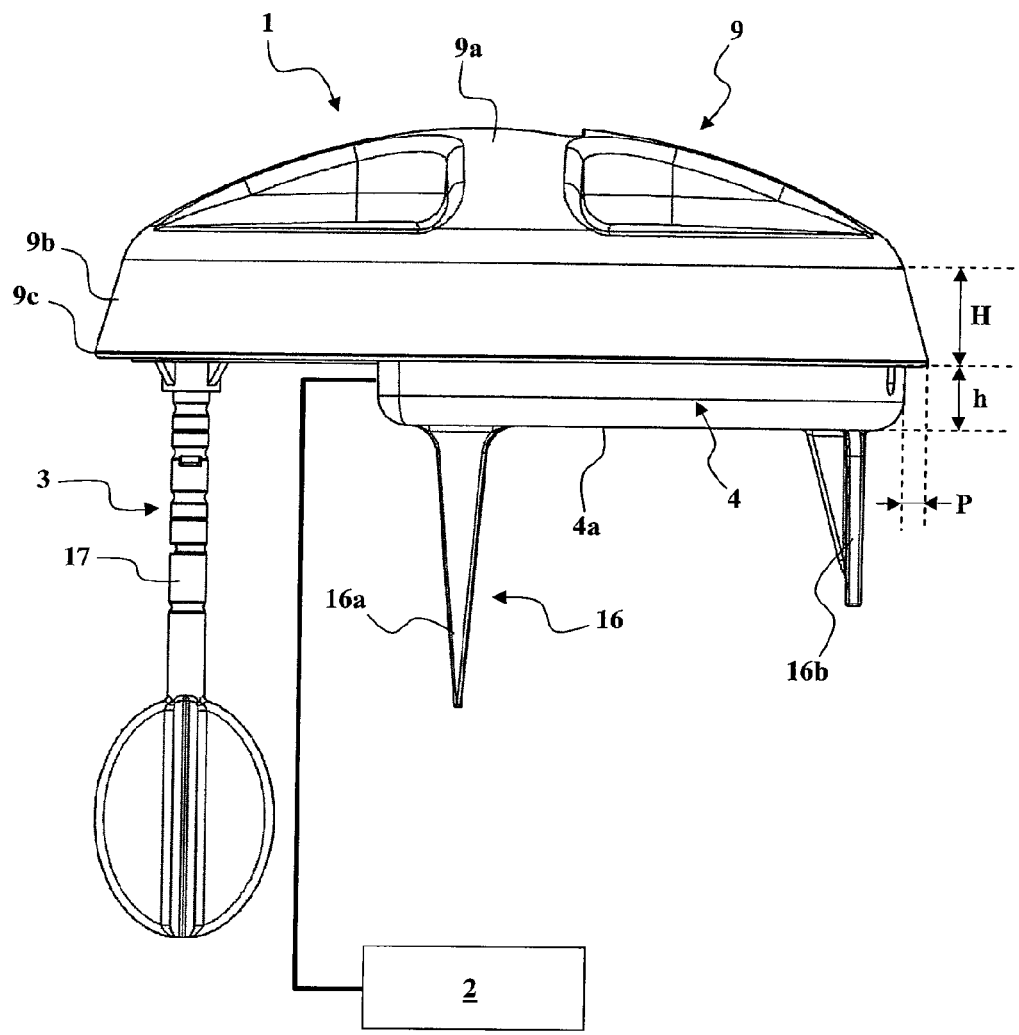
FIG. 1 is a side view of a pyrotechnic device according to a first embodiment of the invention, with a removable cover in the covering position.
Figure 2:
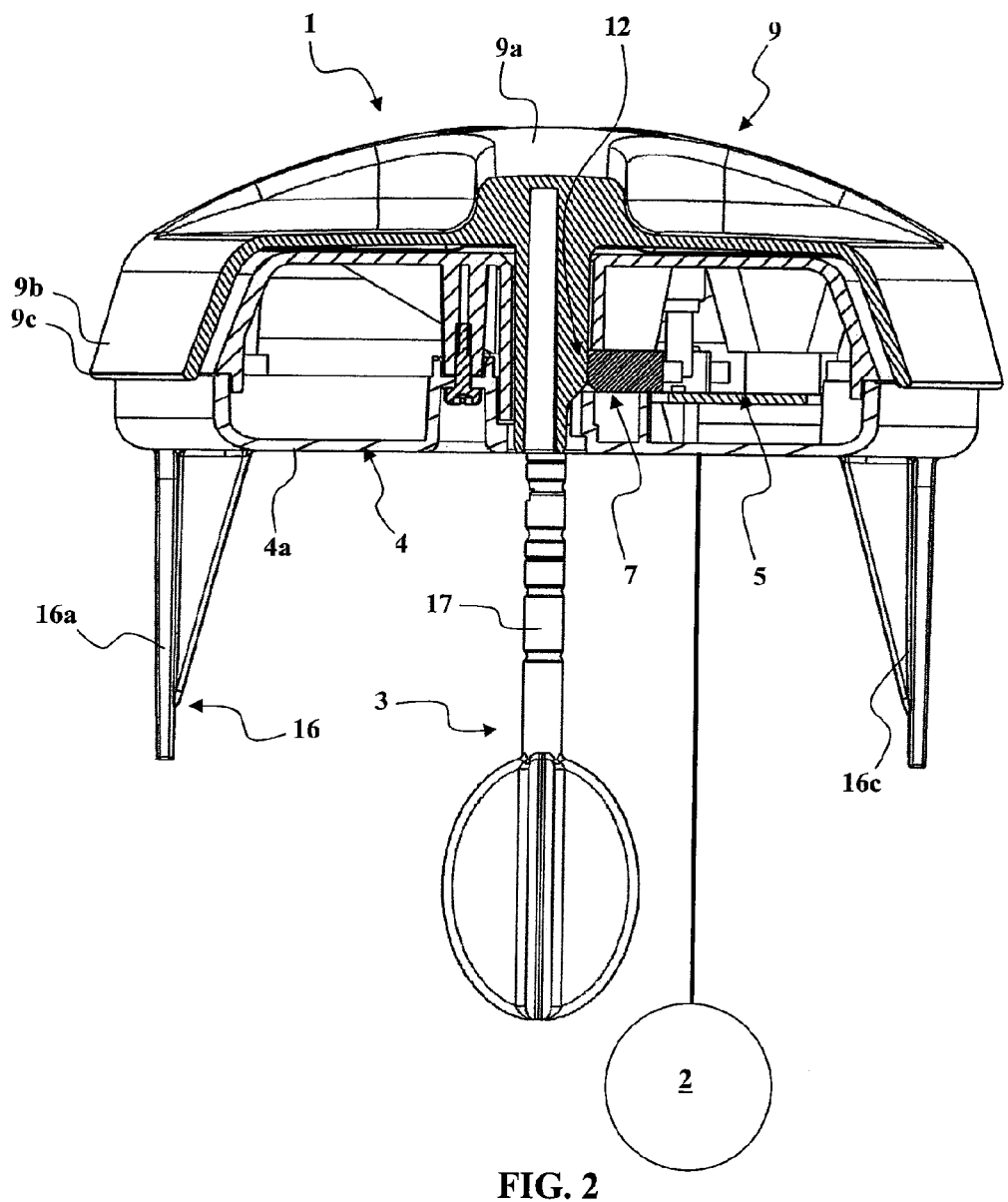
FIG. 2 is a front and cross-sectional view of the pyrotechnic device of FIG. 1.

In FIG. 1, a pyrotechnic device 1 can be seen that is intended for the destruction of animals that dig tunnels such as moles by the firing of a pyrotechnic charge. The pyrotechnic device 1 comprises means 3 for detecting the animal, a pyrotechnic charge 2 and a housing 4.

Figure 5:
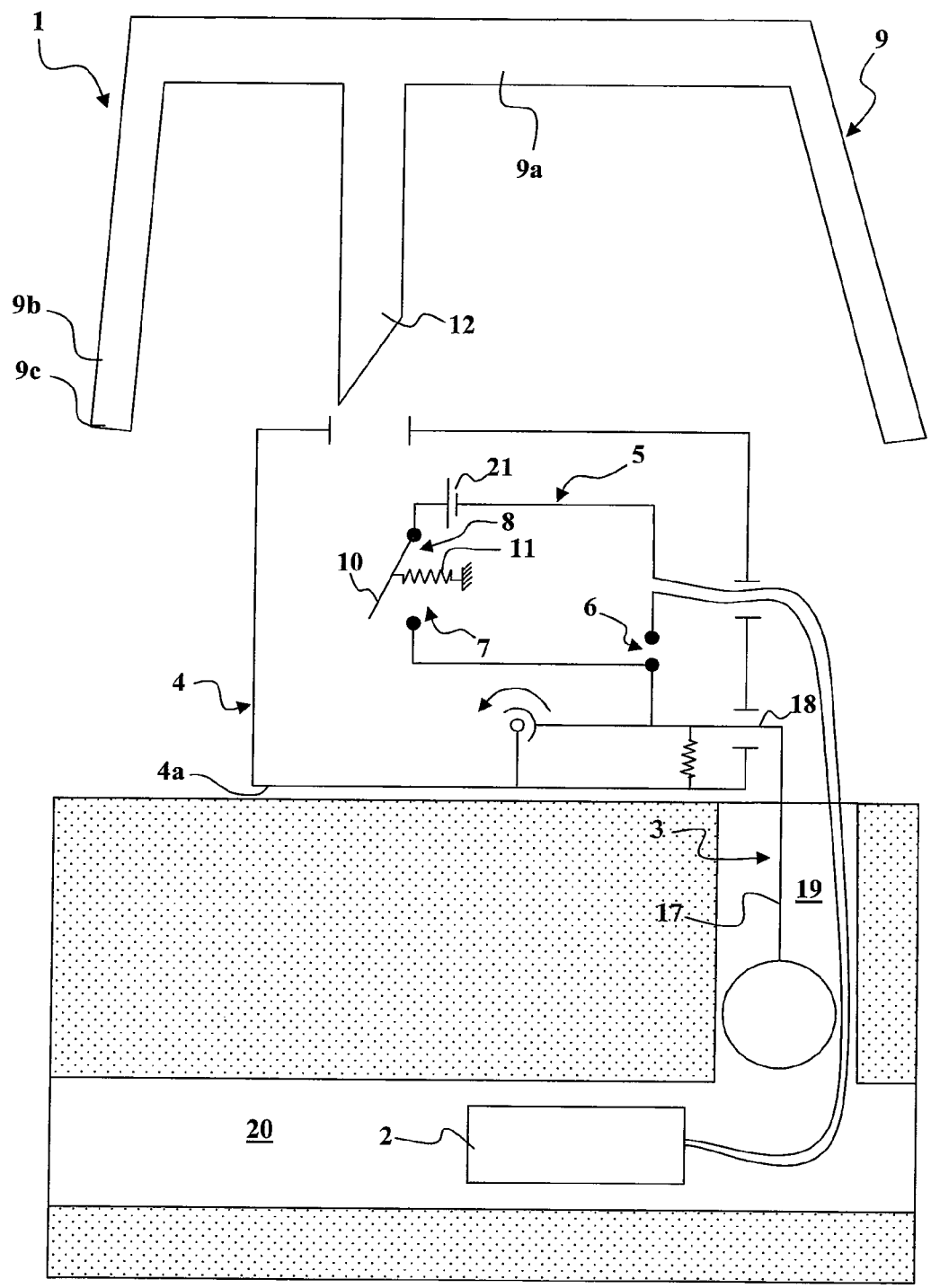
FIG. 5 is a schematic side and cross-sectional view of the pyrotechnic device of FIG. 4.
Figure 7:
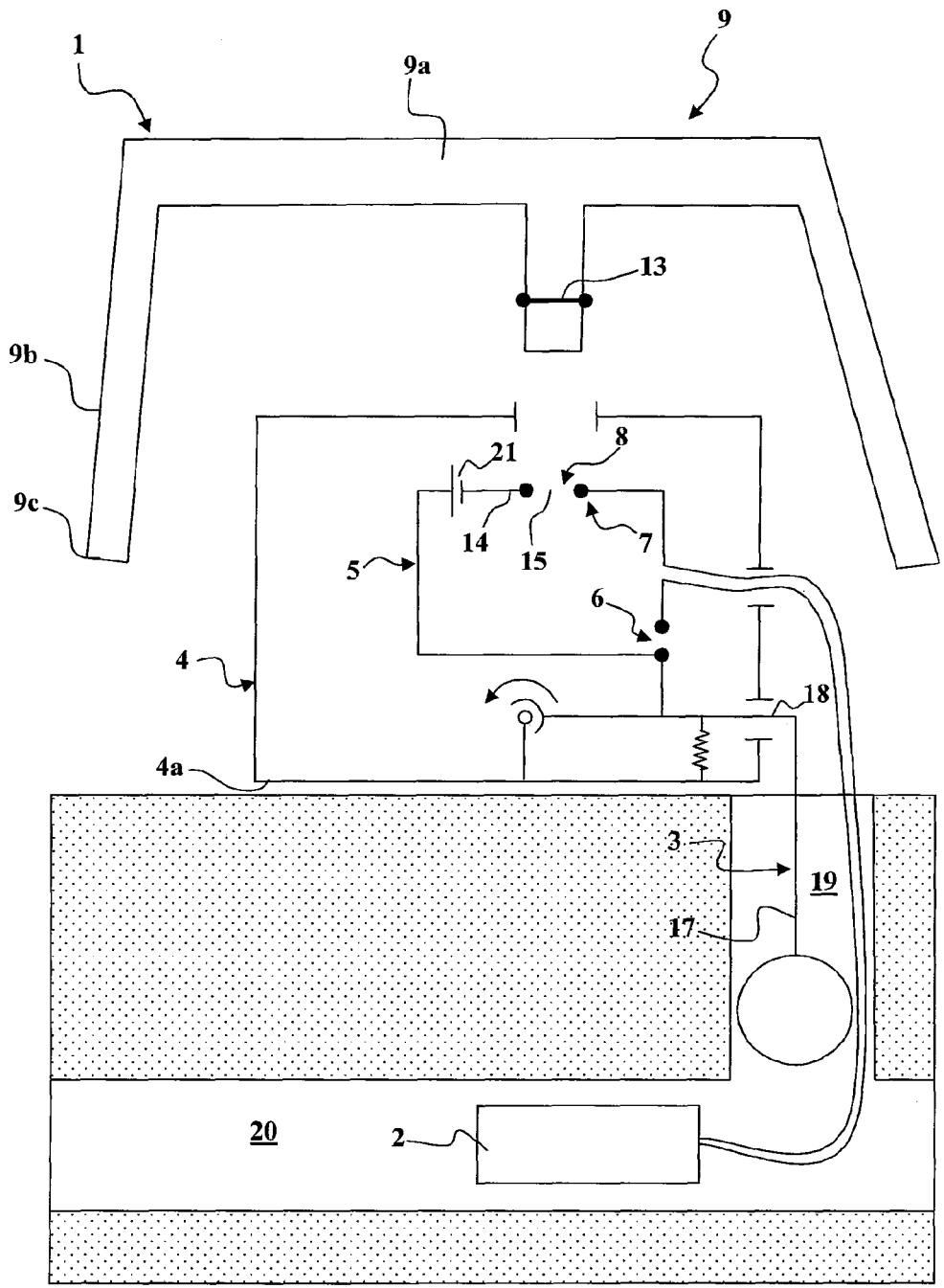
FIG. 7 is a schematic side and cross-sectional view of the pyrotechnic device of FIG. 6 with its removable cover in the removed position.

As can be seen more particularly in FIGS. 5 and 7, the housing 4 contains:
- an electrical firing circuit 5 comprising a firing contactor 6 driven by the detection means 3, means 7 for breaking the electrical firing circuit 5, making it possible to selectively break or re-establish the continuity of a section 8 of electrical firing circuit 5.

The pyrotechnic device 1 comprises a removable cover 9, that a user can selectively fit over the housing 4 and over the detection means 3 in a covering position (FIGS. 1 to 3 and 6), and that the user can selectively separate from the housing 4 in a removed position (FIGS. 4, 5, 7, 9 and 10).

Figure 3:
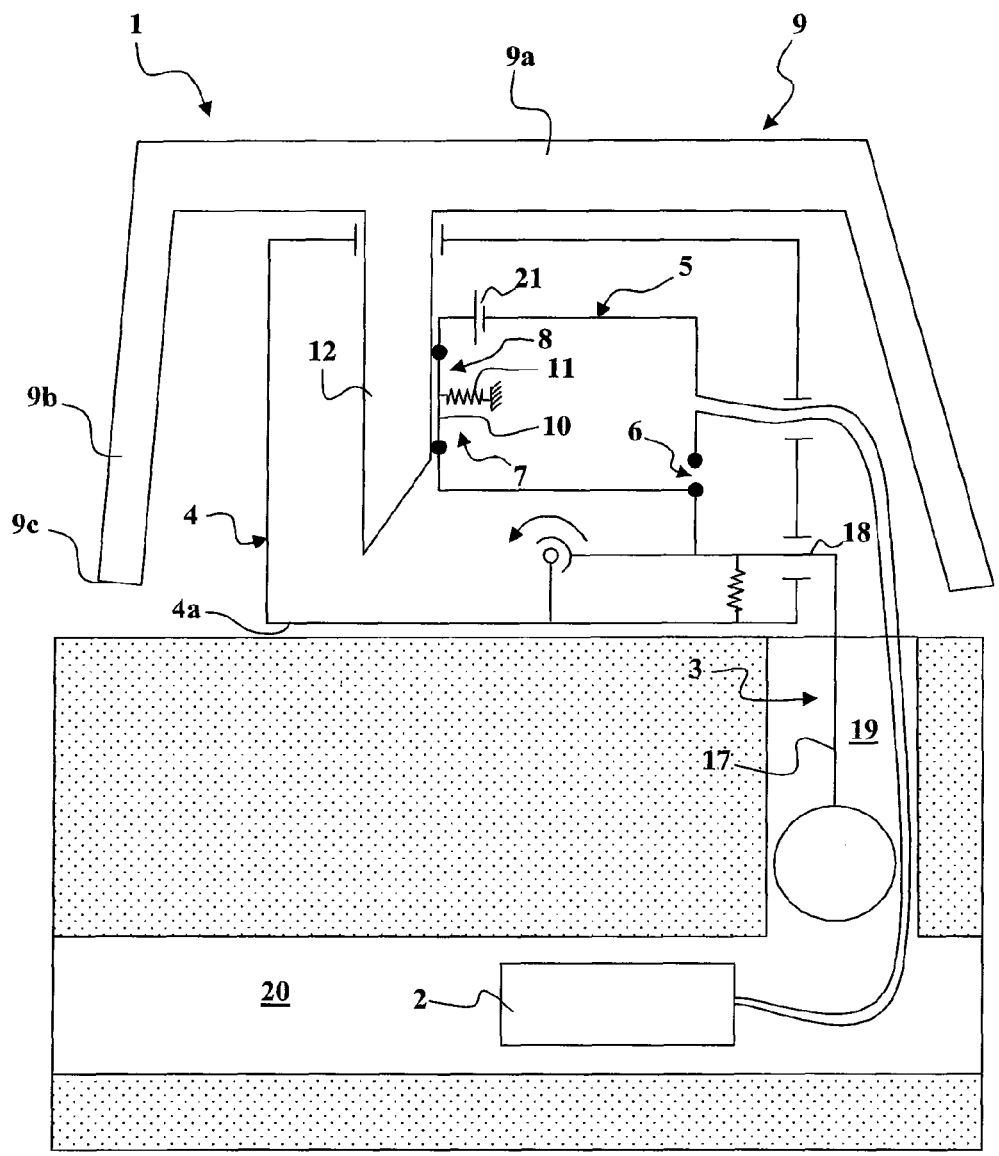
FIG. 3 is a schematic side and cross-sectional view of the pyrotechnic device of FIG. 1.
Figure 4:
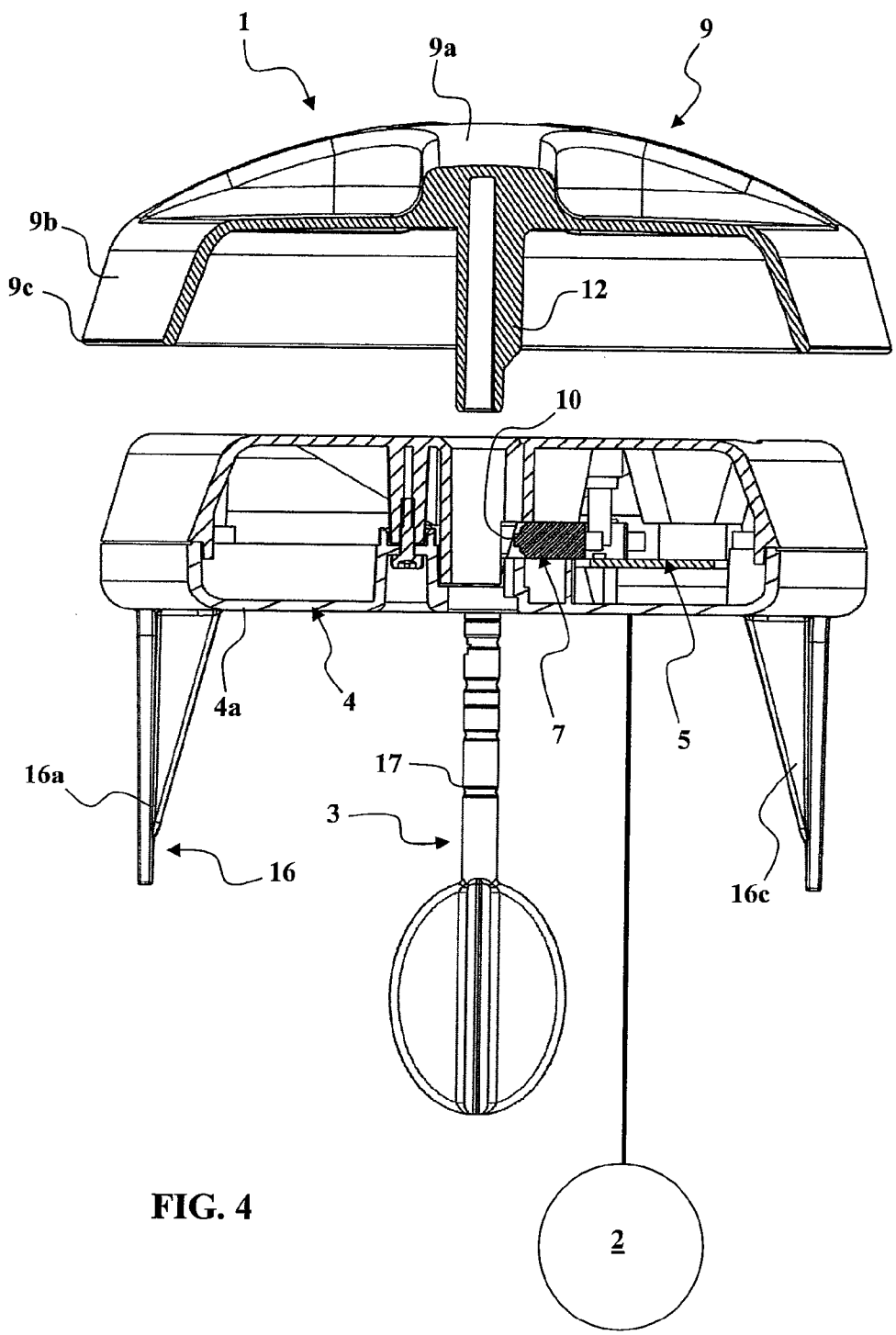
FIG. 4 is a view of the pyrotechnic device of FIG. 2 with its removable cover in the removed position.
Figure 6:
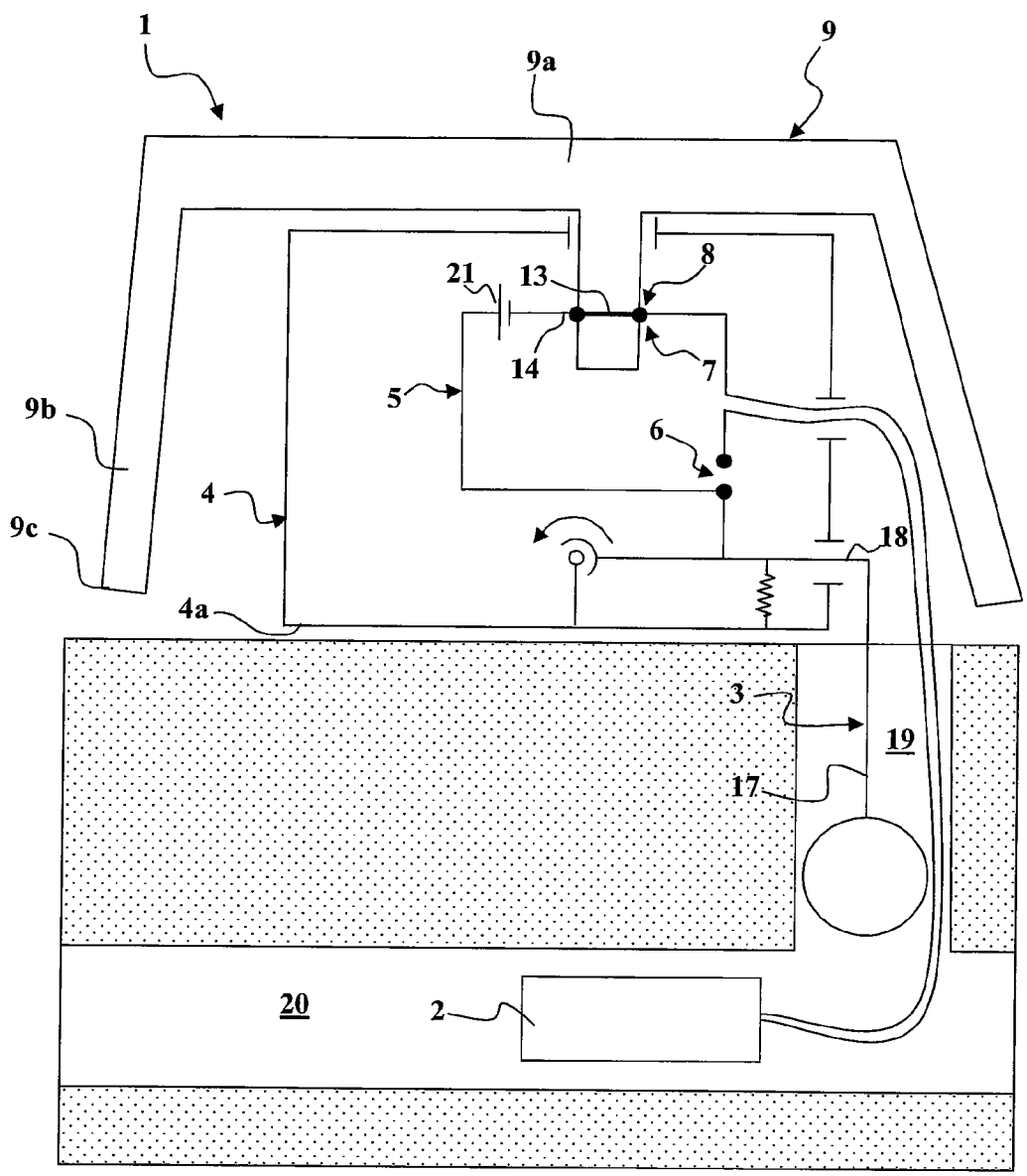
FIG. 6 is a schematic side and cross-sectional view of a pyrotechnic device according to a second embodiment of the invention, with a removable cover in the covering position.

In the removed position of the cover 9, the continuity of the section 8 of electrical firing circuit 5 is broken (FIGS. 5 and 7), whereas in the covering position of the cover 9, the continuity of the section 8 of electrical firing circuit 5 is established (FIGS. 3 and 6).

FIGS. 2 to 5 illustrate a first embodiment of the invention. In this first embodiment, provision is made for:
the breaking means 7 to include a switch 10 that can be displaced or deformed, for example by pivoting, connected in series in the electrical firing circuit 5, and permanently returned to the open position by elastic return means 11,
the cover 9 to include bearing means 12 which, when the cover 9 is displaced to the covering position (FIG. 3), push back the switch 10 to the closed position against the elastic return means 11.

In a second embodiment of the invention schematically illustrated in FIGS. 6 and 7, provision is made for:
the electrical firing circuit 5 to comprise a movable circuit section 13 attached to the cover 9, and a fixed circuit part 14 attached to the housing 4, said fixed circuit part 14 including a break 15,
when the cover 9 is in the covering position (FIG. 6), the movable circuit section 13 to be in contact with the fixed circuit part 14 to establish the continuity of the electrical firing circuit 5 in the area of the break 15.

It can be seen more particularly in FIG. 1 that:
the housing 4 has a bottom laying face 4a suitable for resting on the ground,
the housing 4 and the cover 9 are conformed and dimensioned so that, when the housing 4 rests on the ground and the cover 9 is in the covering position, the cover 9 covers everything and prevents a user from being able to manually grasp the housing 4 and the detection means 3.

Figure 11:
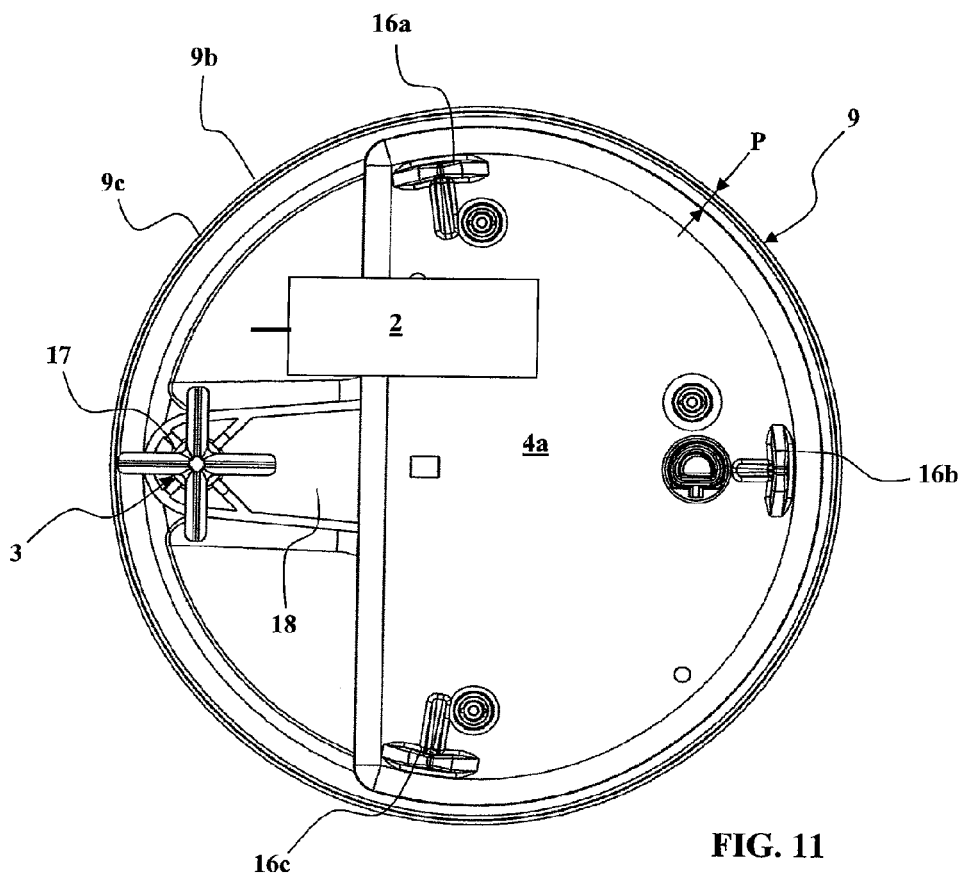
FIG. 11 is a view from below of the pyrotechnic device of FIG. 1.
Figure 12:
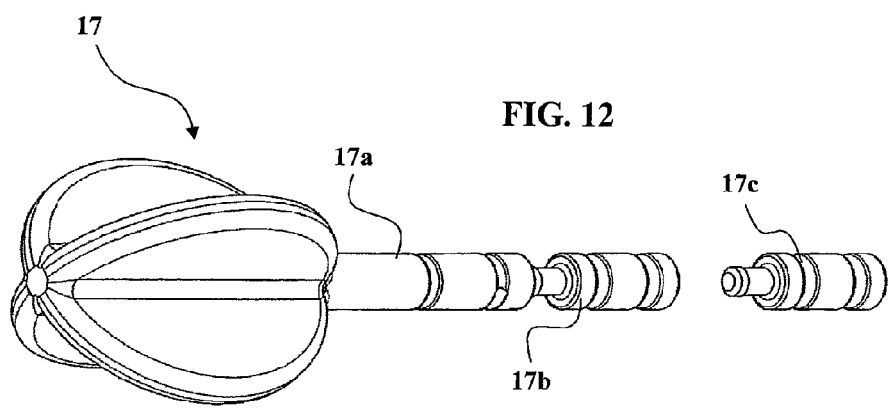
FIG. 12 is a perspective view of a feeler during assembly.

It can be seen more particularly in FIG. 1 that the cover 9 includes a top wall 9a and a lateral peripheral wall 9b with dimensions such that said top wall 9a and the lateral peripheral wall 9b jut out radially all around the housing 4 and the detection means 3 by a peripheral overhang P (FIGS. 1 and 11).

Figure 8:
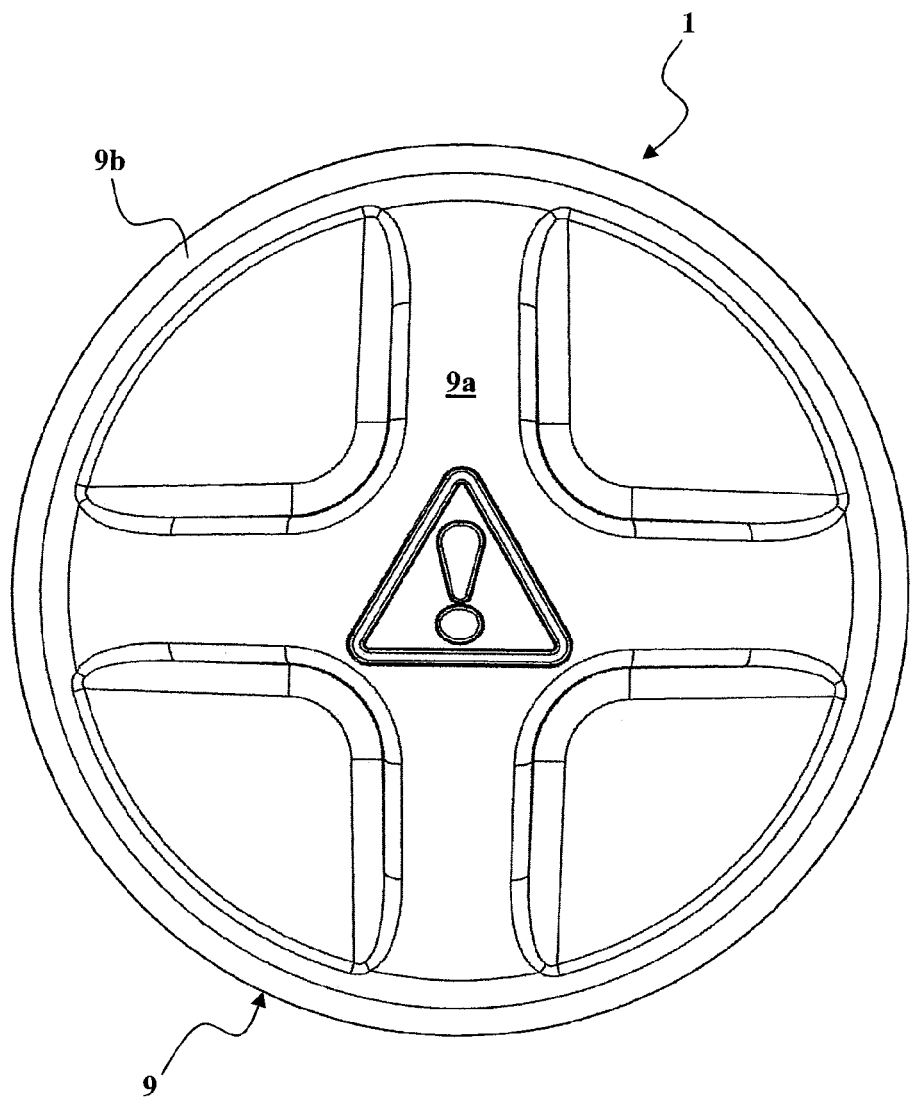
FIG. 8 is a plan view of the pyrotechnic device of FIG. 1.

This way, once in place on the ground, the pyrotechnic device 1 appears as illustrated in the plan view in FIG. 8: the detection means 3 and the housing 4 are totally covered by the top wall 9a of the cover 9 and are therefore inaccessible.

Figure 9:
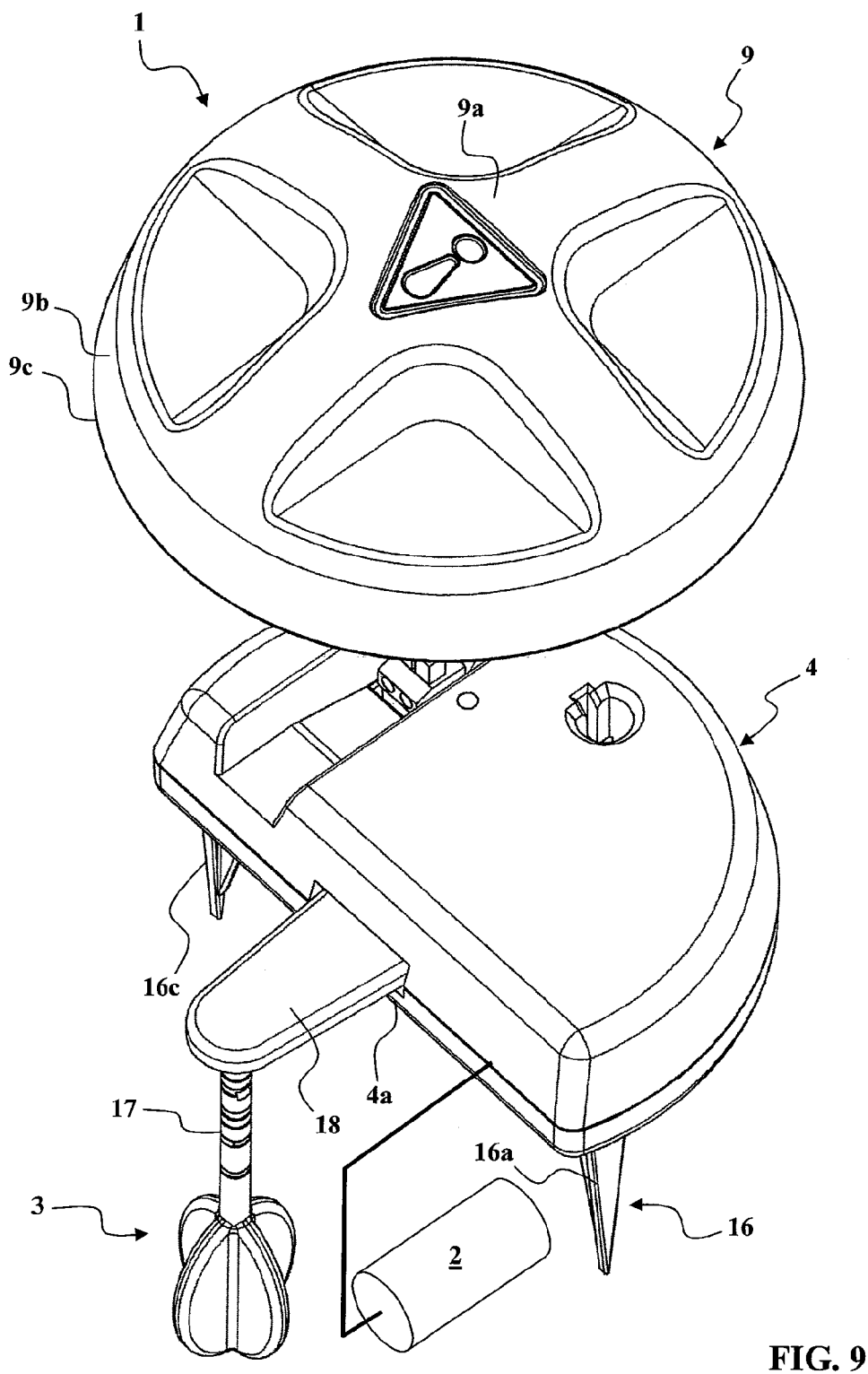
FIG. 9 is a perspective view from above of the pyrotechnic device of FIG. 4.
Figure 10:
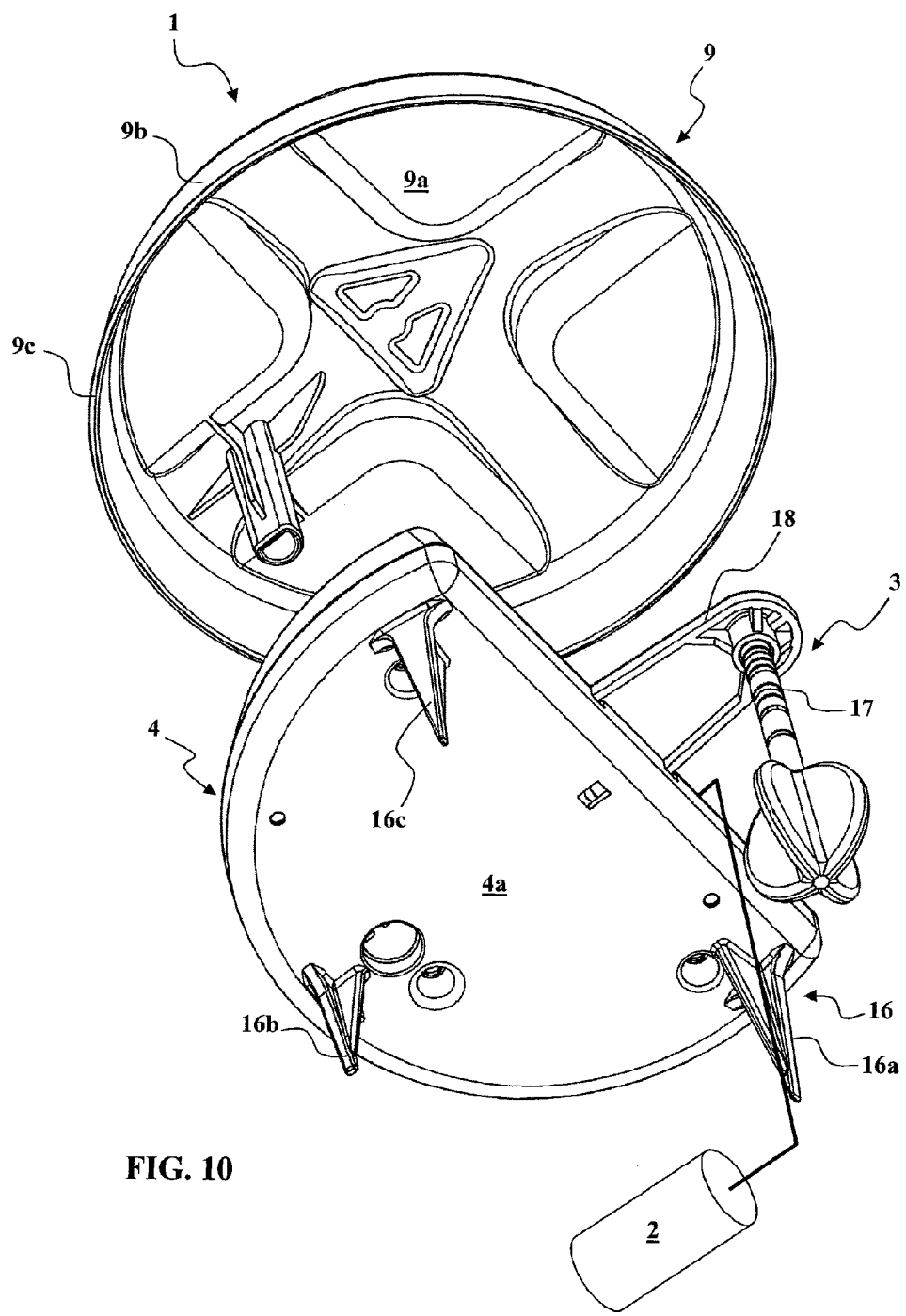
FIG. 10 is a perspective view from below of the pyrotechnic device of FIG. 4.

It can be seen more particularly in FIGS. 1, 9 and 10 that:
the housing 4 has a bottom laying face 4a suitable for resting on the ground,
the cover 9 has a lateral peripheral wall 9b extending away from the top wall 9a to a bottom peripheral edge 9c.

It can be seen more particularly in FIG. 1 that the lateral peripheral wall 9b has a height H such that, when the housing 4 rests on the ground and the cover 9 is fitted on the housing 4, the bottom peripheral edge 9c is situated in the vicinity of the level of the bottom laying face 4a. This more effectively limits the access to the housing 4 and to the detection means 3 when the pyrotechnic device 1 is put in place on the ground and activated. In practice, provision can be made for the bottom peripheral edge 9c to be situated at a reduced height h from the bottom laying face 4a, this height h being less than or equal to approximately 1 cm, in order to prevent the passage of fingers between the bottom peripheral edge 9c and the ground.

It can be seen more particularly in FIG. 10 that:
the housing 4 has a bottom laying face 4a suitable for resting on the ground,
the housing 4 includes means 16 for anchoring in the ground extending from the bottom laying face 4a.

In the case in point, the anchoring means 16 comprise three spikes 16a to 16c which can be used to stably anchor the housing 4 in the ground.

The anchoring means 16 oppose the untimely and unwanted movements of the housing 4 and/or of the detection means 3, which movements could trigger an accidental firing of the pyrotechnic charge 2 when a user is in proximity.

In FIGS. 1 to 7 and 9 to 11, the detection means comprise a feeler 17 intended to be inserted in the tunnel of the animal. Since the tunnel of the animal can be situated at variable depths, the feeler 17 comprises a plurality of rod sections 17a to 17c (FIG. 12), some of which (17b, 17c) are separable. Depending on the depth of the tunnel of the animal, the user can choose to add to the end section 17a one or more separable sections 17b and 17c.

In an alternative, not represented in the figures, the feeler 17 may comprise a telescopic rod with sliding sections, the telescopic nature of the rod making it possible to continuously and best adjust the length of the feeler 17.

The use of the pyrotechnic device 1 according to the invention is explained hereinbelow by means of FIGS. 3 and 5 to 7.

The user begins by opening up the vertical shaft 19 of the molehill to reach the tunnel 20. The pyrotechnic charge 2 is installed in the tunnel 20. Then, the feeler 17 is assembled in order for the latter to have a satisfactory height.

The feeler 17 is then fixed by its top end to a lever 18 which can be more particularly seen in FIGS. 9 to 11.

The user then fits the housing 4 provided with the feeler 17 over the molehill by engaging the feeler 17 in the vertical shaft 19 of the molehill. Up to that point, the housing 4 is without its removable cover 9, which ensures a break 15 in the continuity of the section 8 of the electrical firing circuit 5. The user thus does not risk accidentally triggering the firing of the pyrotechnic charge 2.

When the housing 4 is put in place, the user anchors the housing 4 in the ground using the spikes 16a to 16c.

The user then fits the removable cover 9 in the covering position, which has the effect of establishing continuity of the section 8 of electrical firing circuit 5: the pyrotechnic device 1 is then activated and ready to be triggered if an animal is detected.

After the pyrotechnic device 1 has been installed, the cover 9 limits any access on the part of a user or of a child to the detection means 3 and to the housing 4, which prevents an accidental firing of the pyrotechnic charge 2. In practice, to manipulate the pyrotechnic device 1 and/or remove it, the user or the child has to first remove the removable cover 9, which has the effect of breaking the continuity of the section 8 of electrical firing circuit 5. The pyrotechnic device 1 is then deactivated and the pyrotechnic charge 2 can no longer be fired, even by displacing the housing 4 or the feeler 17.

The safety of users and children is thus assured when installing, using and removing the pyrotechnic device 1.

When the pyrotechnic device 1 is activated and an animal displaces the feeler 17 (for example when a mole tries to plug again the vertical shaft 19), the movement is transmitted to the lever 18 which is displaced and closes the firing contactor 6.

The electrical energy from the electrical power source 21 then fires the pyrotechnic charge 2, which explodes and kills the animal.

The present invention is not limited to the embodiments which have been explicitly described, but it includes miscellaneous variants and generalizations thereof contained within the scope of the claims below.

The invention claimed is:

1. A pyrotechnic device intended for the destruction of animals that dig tunnels such as moles by firing a pyrotechnic charge, comprising detection means for detecting the animals and a housing, in which:

the housing contains an electrical firing circuit comprising a firing contactor driven by the detection means, the housing contains means for breaking the electrical firing circuit, making it possible to selectively break or re-establish a continuity of a section of the electrical firing circuit, the pyrotechnic device further comprises a cover which can be arranged over the housing and over the detection means in a covering position, such that fitting the cover in the covering position is sufficient to establish the continuity of the section of the electrical firing circuit, wherein the cover is not locked to the housing and is freely removable from the housing, so as to be able to be separated from the housing in a removed position in which the continuity of the section of the electrical firing circuit is broken, wherein, in the removed position, the housing and the cover are separated and not in contact with each other, wherein the housing has a bottom laying face suitable for resting on a ground surface, wherein the cover includes a lateral peripheral wall extending away from an entire perimeter of a top wall to a bottom peripheral edge, the lateral peripheral wall extending completely around the housing and detection means when the cover is arranged over the housing and detection means in the covering position, and wherein the lateral peripheral wall has a height such that, when the housing rests on the ground surface and the cover is fitted on the housing, in the covering position, the bottom peripheral edge is situated in a vicinity of a level of the bottom laying face.

2. A pyrotechnic device according to claim 1, wherein:

the breaking means comprise a switch, connected in series in the electrical firing circuit, and permanently returned to an open position by elastic return means, the cover includes bearing means which, when the cover is moved to the covering position, push back the switch to a closed position against the elastic return means.

3. A pyrotechnic device according to claim 1, wherein:

the section of the electrical firing circuit comprises a movable circuit section attached to the cover and a fixed circuit part attached to the housing, said fixed circuit part including a break of the breaking means, when the cover is in the covering position, the movable circuit section is in contact with the fixed circuit part to establish the continuity of the section of the electrical firing circuit in an area of the break.

4. A pyrotechnic device according to claim 1, wherein:

the housing and the cover are conformed and dimensioned so that, when the housing rests on the ground surface and the cover is in the covering position, the cover prevents a user from being able to manually grasp the housing and the detection means.

5. A pyrotechnic device according to claim 1, wherein the cover including the top wall and the lateral peripheral wall has dimensions such that said top wall and lateral peripheral wall jut out all around the housing and the detection means by a peripheral overhang.

6. A pyrotechnic device according to claim 1, wherein the detection means include a feeler intended to by wholly or partly inserted into a tunnel of the animals.

7. A pyrotechnic device according to claim 6, wherein said feeler comprises a plurality of separable rod sections.

8. A pyrotechnic device according to claim 6, wherein said feeler comprises a telescopic rod.

9. A pyrotechnic device according to claim 1, wherein:

the housing includes means for anchoring in the ground extending from the bottom laying face.

* * * * *